United States Patent [19]

Lev

[11] B 3,914,688
[45] Oct. 21, 1975

[54] COLD SPOT DETECTOR FOR LNG TANKS AND TANKERS

[75] Inventor: Yaacov Lev, Liverpool, England

[73] Assignee: Shell Oil Company, Houston, Tex.

[22] Filed: Oct. 1, 1973

[21] Appl. No.: 402,555

[44] Published under the Trial Voluntary Protest Program on January 28, 1975 as document no. B 402,555.

[30] Foreign Application Priority Data

Oct. 4, 1972 United Kingdom............... 45692/72

[52] U.S. Cl................. 324/71 R; 324/30 R; 73/342
[51] Int. Cl.².......................................... G01N 27/00
[58] Field of Search.................. 324/71 R, 30 R, 52; 340/234, 228

[56] References Cited
UNITED STATES PATENTS 3,510,762   5/1970   Leslie.................................... 324/52

OTHER PUBLICATIONS

Horne, R. A., Courant R. A., "The Electric Conductivity of Aqueous Electrolytic Solutions near the Freezing Point," The Journal of Physical Chemistry, Vol. 68, No. 5, May 1964.

Primary Examiner—Alfred E. Smith
Assistant Examiner—Rolf Hille

[57] ABSTRACT

A method and apparatus for detecting leaks or failures in the insulation of a cold storage container wherein electrically non-conducting conduits are placed in cold transfer relationship with the insulation. The conduits are filled with an ion-conducting material that solidifies when subjected to the temperatures produced by a leak in the insulation and changes conductivity when it solidifies. The conductivity of the material filling the conduits is monitored to detect leaks in the insulation.

17 Claims, 3 Drawing Figures

COLD SPOT DETECTOR FOR LNG TANKS AND TANKERS

BACKGROUND OF THE INVENTION

The present invention relates to a method of detecting a failure in a cold-insulation system and to apparatus for use therewith.

In order to maintain a body at a desired temperature below room temperature while minimizing the amount of externally applied cooling it is usual to surround the said body with an insulation system. An added advantage of this system is that because the cold from the body is effectively shielded by the insulation external containers and associated equipment may be manufactured from material less susceptible to the effects of the cold than if the body were not so shielded.

For example, a tank to contain a cryogenic liquid may comprise an inner container manufactured from a membrane of a relatively expensive material capable of containing the cryogenic liquid against leakage but which by itself would not be strong enough to withstand the pressure of the weight of the liquid. This inner membrane tank may be surrounded by a suitable insulation system such as polyurethane foam or blocks of balsa wood, and this in turn may be surrounded by an outer tank manufactured from a much less expensive material which would be too brittle at cryogenic temperatures but which at room temperature is strong enough to withstand the weight of its contents. Tanks of this type are shown in U.S. Pat. No. 3,039,418.

It can be understood that if a fault such as a crack developed in the insulation system surrounding the membrane tank the liquid itself would continue to be contained but the cold therefrom would leak through the fault to the outer tank which would become chilled causing it to become brittle in the area in contact with the fault. Such an area is called a cold-spot. An area of brittleness thus formed at a cold-spot could lead to catastrophic failure of the tank as a whole and to dangerous spillage.

The normal methods employed to detect cold-spots involve either the visual inspection of the outer container for ice formation or the attachment of temperature measuring means, such as thermocouples to the surface of the outer container, or into the body of the insulation and the determination of temperature changes detected. The former method is time-consuming and can be both difficult and unpleasant, while the latter is expensive to install and maintain. The demerits of the above methods are increased greatly, when extended to tanks as employed in the large bulk liquid gas marine tankers of the present day, and will be even further increased when projected designs for still larger vessels are brought to completion.

BRIEF SUMMARY OF THE INVENTION

The present invention provides a method for detecting a failure in a cold-insulation system comprising maintaining in cold transfer contact with said insulation system an electrically non-conducting conduit containing an ion-conducting material which will solidify under the action of cold leaking through said insulation system and which has a different conductivity when solid, and monitoring the conductivity of said ion-conducting material.

The present invention also provides a device for detecting a failure in a cold-insulation system, said device comprising an electrically non-conducting conduit containing an ion-conducting material which will solidify under the action of induced cold and which has a different conductivity when solid said conduit having at alternate ends thereof, in contact with said ion-conducting material, a pair of electrodes externally connected together in such a manner as to facilitate measurement of the ionic-conductivity of said ion-conducting material, and means to monitor the ionic-conductivity of said ion-conducting material adapted to be placed in electrical connection with said electrodes.

Ionic-conductivity in liquids and solutions is viscosity dependent and therefore varies appreciably with temperature, the lower the temperature the higher the viscosity and hence the lower the conductivity. Freezing will cause a very sharp drop in conductivity. Since transport of ions through solid lattice requires higher energy than is available movement of ions under these conditions is restricted to filling vacant lattice sites. The drop in conductivity due to freezing is easily detectable and can be used if required to trigger a warning device.

An electrically non-conducting conduit containing an ion-conducting material which will solidify under the action of induced cold is placed in cold transfer contact with an insulation system which it is expected may develop a leak or leaks, such as by attaching it to the face of a surrounding container or embedding it between layers of the said insulation system. A pair of electrodes are attached one at either end so as to be in contact with the said electrolyte, and means to monitor the current flowing and hence the ionic-conductivity within the system. When the insulation system is functioning properly the said ionic-conducting material will be maintained at some temperature at or about room temperature and an easily detectable current will flow, but in the advent of a failure in the insulating system, cold leaking through the insulation system will cause the said ionic-conducting material within the conduit in the area of contact with the leak to solidify. The current flow through the electrolyte in the conduit will substantially cease and the ionic-conductivity of the system to be recorded as substantially nil. Any warning means attached to the means monitoring the ionic-conductivity can be triggered by this easily detectable change.

When the area of insulation to be monitored is very large, such as in the case of the tanks of a liquefied gas vessel, it is convenient to employ a large number of conduits permanently positioned as suggested and to interrogate them individually or in series in sequence from a central control means. Because of the possible limitations in this situation of using applied currents it may also be convenient to use electrodes of suitable dissimilar metals and generate a current in-situ between them.

Suitable conduits can be employed in series positioned so as to form a grid or a series of grids, i.e., one series being positioned at right-angles to another in the same plane. In this way cold leaking through the insulation will effect the current flow in at least one conduit positioned in each direction.

BRIEF DESCRIPTION OF THE DRAWINGS

The present invention will be further described by way of illustration with reference to the drawings wherein.

PREFERRED EMBODIMENT

According to a preferred embodiment of the present invention a plurality of said non-conducting conduits are placed side-by-side in cold transfer contact with an insulation system, each of the conduits containing a different ion-conducting material, the said ion-conducting material being selected to have different freezing points and conductivity/temperature relationships. A family of conductivity/temperature curves will exist for varying lengths of each of the ion-conducting materials in its respective conduit. By comparison of the currents detected in each conduit and superimposition of the relevant curves, the length of each conduit affected by a particular cold-spot and the temperature to which the ion-conducting material therein is being subjected can be determined. Alternatively, a mathematical solution can be formulated having first expressed mathematically the conductivity/temperature relationships.

Figure 3:
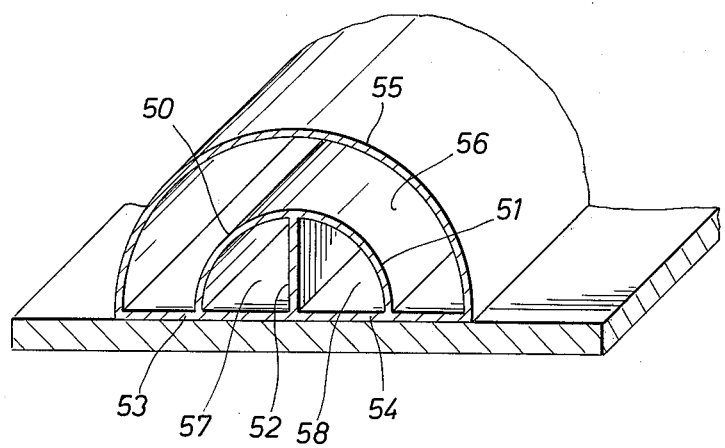
FIG. 3 shows in end-on view a complex conduit suitable for use with a second embodiment.

Positioning such pluralities of non-conducting conduits so as to form a grid or series of grids, as discussed earlier, will facilitate the determination of the shape of the cold-spot. For convenience the plurality of non-conducting conduits may be formed as separate side-by-side channels in one complex conduit. This complex conduit can also be formed so as to provide cold-transfer contact on the one side between the individual channels and the insulation system to be monitored and to contain an integral air insulation duct on the other. Such a conduit is illustrated by FIG. 3 of the attached drawings.

It will be understood from the above that using the present method and apparatus even small failures in insulation systems may be accurately and quickly detected and pin-pointed.

EXAMPLES 136.5 meters of 7 millimeter bore, 1.5 millimeter wall thickness plastic tube was filled with brine solution (60 grams NaCl/liter of water), a copper anode and a zinc cathode were immersed in the brine at either end of the tube and gave a current of $0.5\mu A$ at 0.7 volts. The tube was placed in contact with a metal plate a section of which was cooled to $-30°C$, the brine solution in the tube froze within 5 minutes and the current flowing dropped to zero.

Similar experiments were carried out using gelatin encased in plastic film and sodium silicate instead of brine in the plastic tube equipment described above. A positive detection was recorded in each case.

Figure 1:
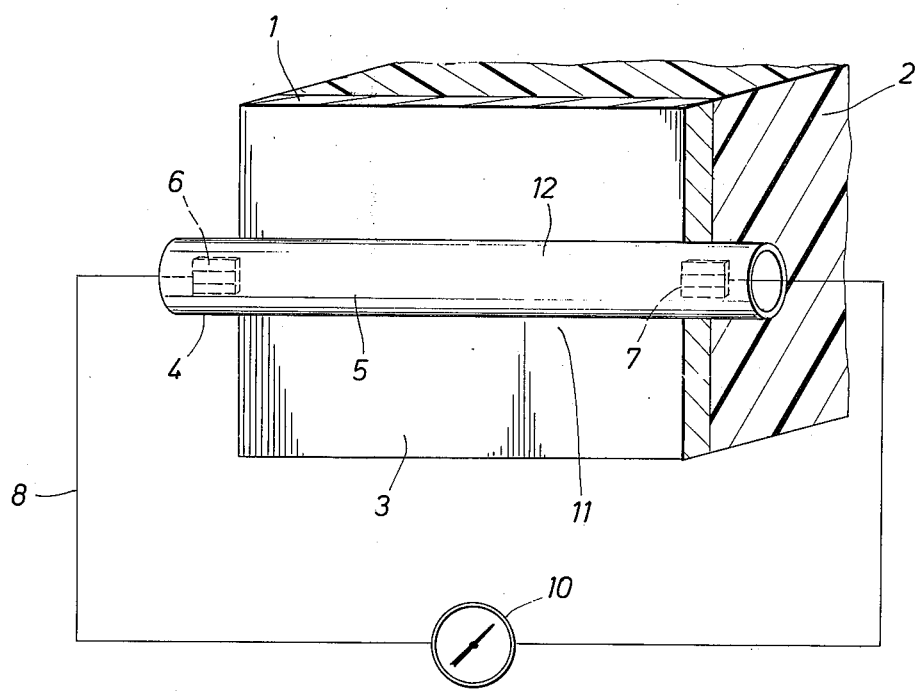
FIG. 1 illustrates the basic apparatus.

Referring to FIG. 1, there is shown a portion of the wall of the container. The wall is formed by an outer wall or metal plate 1, backed by an insulation system 2, has in cold transfer contact with its front face 3, an electrically non-conducting conduit 4, filled with an ion-conducting material 5, and having a metal anode 6, and a metal cathode 7, immersed in the ion-conducting material. The two electrodes 6 and 7 are connected by means of two wires 8 and 9 to an ion-conductivity monitoring means 10.

In the event of a failure developing in the insulation system 2, cold leaks through it and the area 11, of the surface of the metal plate, in contact with it, to the ion-conducting material 5, within the conduit 4. Under the influence of the induced cold the ion-conducting material solidifies at the point 12, nearest the insulation failure and its ionic-conductivity as monitored on the monitoring means 10, drops to substantially zero.

Figure 2:
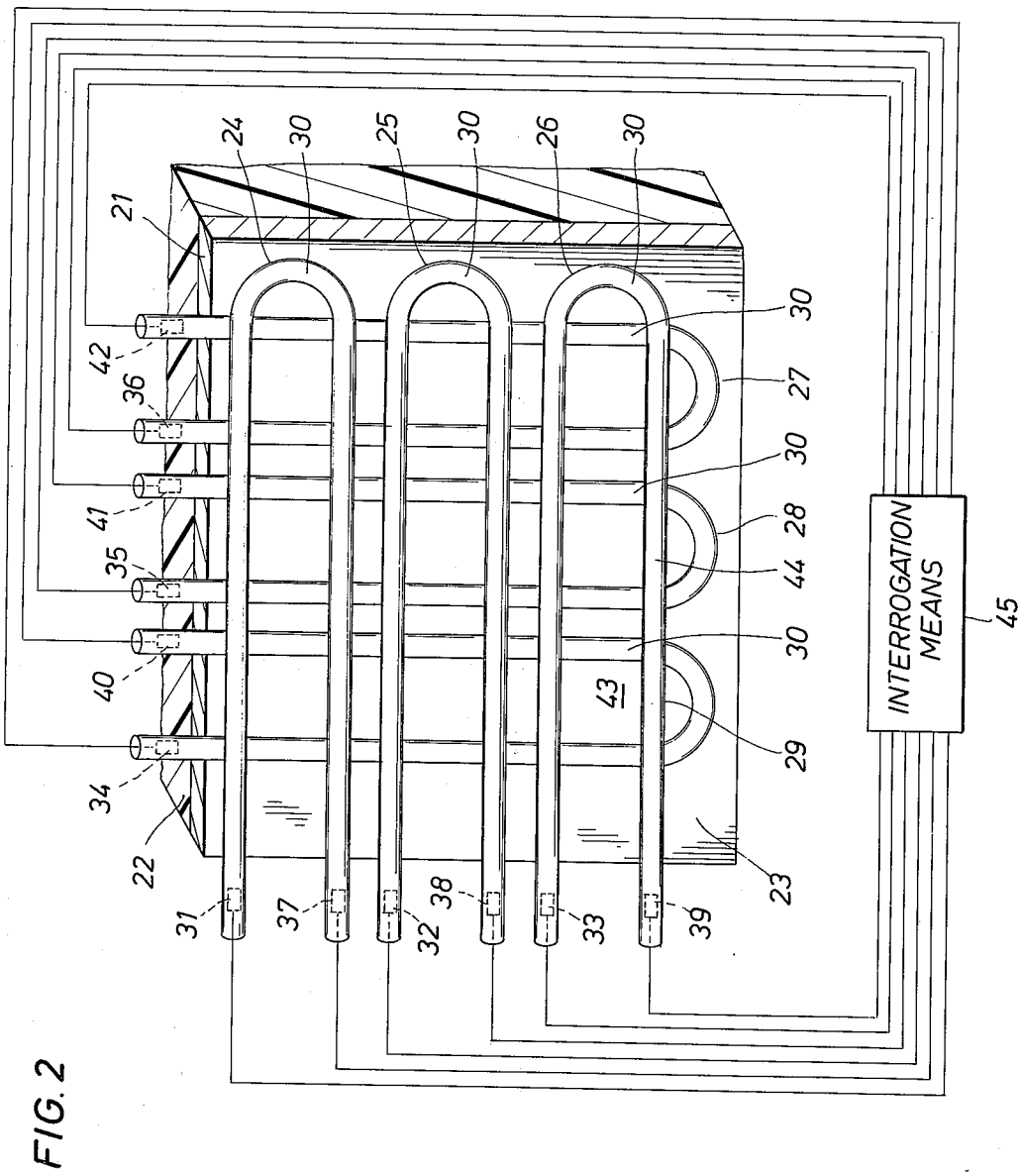
FIG. 2 shows one embodiment of the invention.

Referring to FIG. 2, a metal plate 21, (e.g. the outer wall of a tank for cryogenic liquid), backed by an insulation system 22 has in cold transfer contact with its front face 23, a series of electrically non-conducting conduits 24, 25, 26, 27, 28 and 29, filled with an ion-conducting material 30, and having metal anodes 31, 32, 33, 34, 35 and 36, and metal cathodes 37, 38, 39, 40, 41 and 42, immersed in the ion-conducting material. The electrically non-conducting conduits are arranged on the surface of the plate so as to form a network approximately covering the surface area of the said plate. The electrodes 31, 32, 33, 34, 35, 36, 37, 38, 39, 40, 41 and 42, are connected by wires to an interrogation means 45 which monitors each conduit in turn and detects the presence of any loss of ionic-conductivity. The interrogation means can be programmed to monitor the conduits in any desired sequence, for example, a stepping switch may be used in combination with the monitor shown in FIG. 1.

In the event of a failure developing in the insulation system 22, cold leaks through it and the area 43 of the surface of the plate in contact with it to the ion-conducting material 30, within the conduits 24, 25, 26, 27, 28 and 29 near to it. Under the influence of the induced cold the ion-conducting material solidifies at the point 44, nearest the insulation failure. The ionic-conductivity in the two conduits 25 and 29 drops to substantially zero while remaining unchanged in the others in the network, thus giving a cross-reference to the position of the failure as well as indication of its existence.

Referring to FIG. 3, a complex conduit suitable for use with a preferred embodiment of the present invention, has a semi-circular cross-section and is made of non-conducting material. It comprises two individual channels 50 and 51 in side-by-side relationship sharing a common lateral dividing wall 52, each channel having a second wall 53 and 54 at right-angles to the said dividing wall and adapted to be brought into cold-transfer contact with the insulation system to be monitored, the combination of the two channels being surrounded except for the said second walls 53 and 54 in a further channel 55, which in use contains air or some other suitable insulating material 56. The two channels 50 and 51 in use contain two different ion-conducting materials 57 and 58.

I claim as my invention:
1. An apparatus for detecting a failure in a cold insulating system comprising:
    an electrically non-conducting conduit, said conduit being disposed in cold transfer relation with said cold insulating system;
    an ion-conducting material that will solidify under action of induced cold and having a different conductivity when solid, said conduit being filled with said ion-conducting material;
    a pair of electrodes, one electrode being disposed at each end of said conduit in contact with said ion-conducting material; and
    monitoring means, said monitoring means being coupled to said electrodes to monitor the conductivity of said ion-conducting material.

2. The apparatus of claim 1 wherein a plurality of non-conducting conduits are disposed in cold transfer relation with the warmer side of said cold insulating system, each conduit being filled with ion-conducting material and having an electrode at each end in electrical contact with said electrical conducting material.

3. The apparatus of claim 2 wherein said conduits are arranged in two series with one series at right angles to the other to form a grid.

4. The apparatus of claim 1 wherein said electrodes are formed of dissimilar metals adapted to generate a current in-situ between them.

5. The apparatus of claim 2 wherein said monitoring means is disposed to monitor the conductivity of the conducting material in each conduit in sequence.

6. The apparatus of claim 1 wherein said conduit is permanently mounted on the warmer surface of said cold insulating system.

7. The apparatus of claim 2 wherein the plurality of conduits are divided into groups of conduits with the conduits of each group being in side-by-side relationship, each conduit of the group being filled with a different conducting material.

8. The apparatus of claim 7 wherein the groups of conduits are disposed to form a grid.

9. The apparatus of claim 7 wherein the group of conduits is formed by providing separate channels within a single member.

10. The apparatus of claim 9 wherein the single member is provided with a surface for providing cold transfer contact with all of the channels and the remaining surface of the member is covered with an air insulating duct formed integrally with the member.

11. A method for detecting a failure in a cold-insulation system having a cold side and a warm side, said method comprising:
  maintaining in cold transfer contact with said cold insulating system an ion-conducting material that will solidify under the action of cold leaking from said system and having a different conductivity when solidified; and
  monitoring the conductivity of said conducting material.

12. The method of claim 11 wherein said monitoring consists of placing two electrodes of dissimilar metals in said conducting material at spaced locations.

13. An apparatus for detecting leaks in the insulation of tanks used in transporting liquified natural gas, said tanks having at least an inner insulating layer and an outer shell, said apparatus comprising:
  at least one electrically non-conducting conduit mounted in cold transfer relationship with the outer surface of said outer shell;
  an ion-conducting material that will solidify at temperatures produced in said outer shell by gas leaking through said inner insulating layer, said conducting material in addition having a different conductivity when it solidifies, said conduit being filled with said conducting material;
  a pair of electrodes, one electrode being disposed at each end of the conduit in contact with said conducting material; and
  monitoring means, said monitoring means being coupled to said electrodes to monitor the conductivity of said conducting material.

14. The apparatus of claim 13 wherein said electrodes are of dissimilar metals adapted to generate a current between them when in contact with said conducting material.

15. The apparatus of claim 13 wherein a plurality of conduits are mounted on the outer shell of said tank and said monitor measures the conductivity of the conducting material in said conduits in sequence.

16. The apparatus of claim 15 wherein said conduits are disposed to form a grid on said outer shell.

17. The apparatus of claim 16 wherein each of said conduits is formed by a group of channels disposed within a single member, each of said channels being filled with a conducting material having different freeze points.

* * * * *